No. 786,822. PATENTED APR. 11, 1905.
A. W. LICHTFELD.
MILK COOLER.
APPLICATION FILED JUNE 28, 1904.
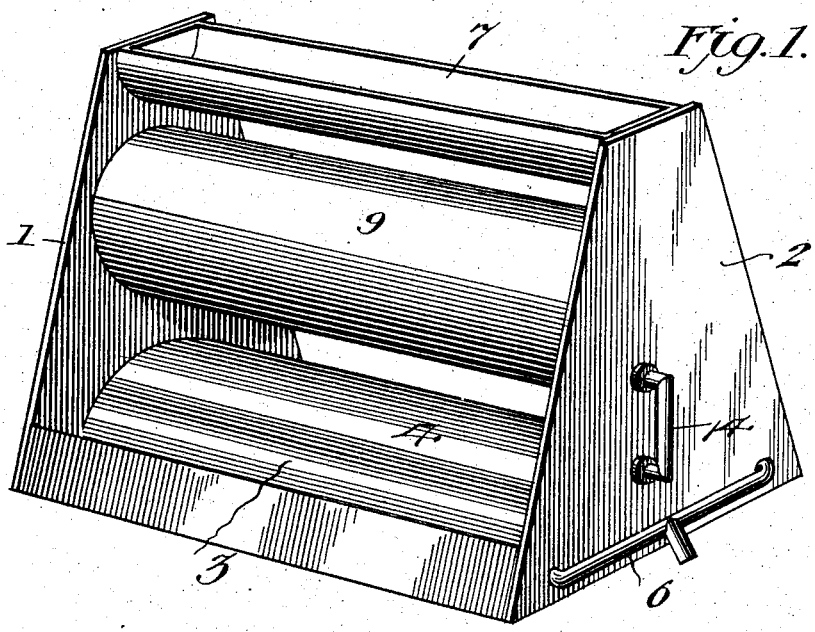
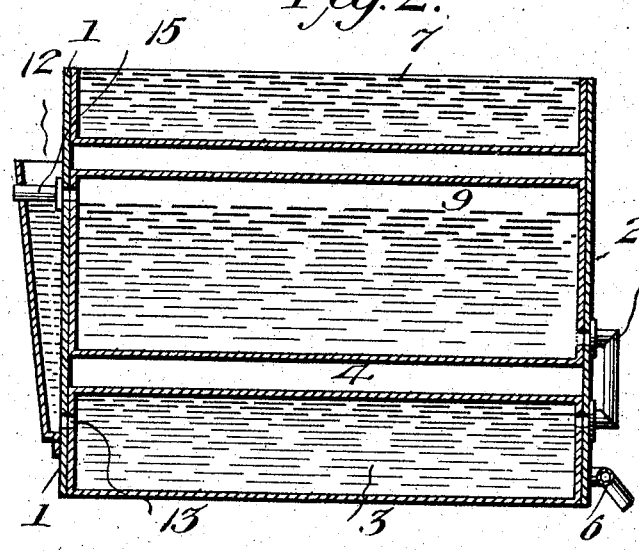
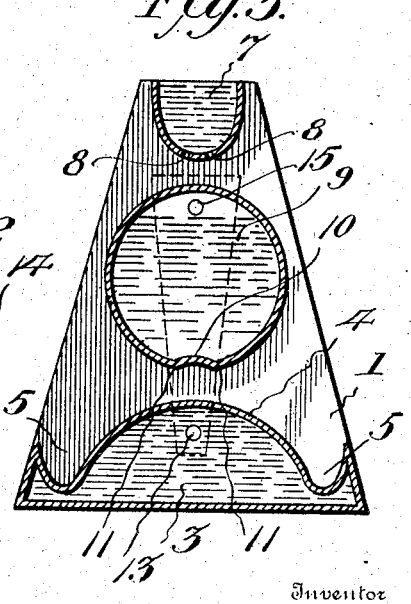
Witnesses
Geo. Ackman Jr.
Leonard A. White
Inventor
Albert W. Lichtfeld,
By Victor J. Evans
Attorney No. 786,822. Patented April 11, 1905.

UNITED STATES PATENT OFFICE.

ALBERT W. LICHTFELD, OF LIBERTYVILLE, ILLINOIS.

MILK-COOLER.

SPECIFICATION forming part of Letters Patent No. 786,822, dated April 11, 1905.

Application filed June 28, 1904. Serial No. 214,550.

*To all whom it may concern:*

Be it known that I, ALBERT W. LICHTFELD, a citizen of the United States, residing at Libertyville, in the county of Lake and State of Illinois, have invented new and useful Improvements in Milk-Coolers, of which the following is a specification.

This invention relates to a milk-cooler of that type in which milk is poured into a trough and escapes from thence through small holes in the bottom onto cooling-surfaces over which it spreads into a thin layer and finally drops or passes into one or more gutters, which convey it either directly or through the means of pipes to a suitable receptacle. Milk passing from the trough to the cooling-surfaces and over them is exposed to the air in such manner that it will be thoroughly cooled, aerated, and deprived of some of its odors.

In the accompanying drawings, Figure 1 is a perspective view of my milk-cooler. Figs. 2 and 3 are respectively a longitudinal and a cross section of the invention.

Similar numerals of reference are employed to indicate like parts in the several views.

The numerals 1 and 2 indicate side plates or frames to which is attached at its base a substantially semicircular tank 3 for the reception of water. The base of this tank is flat, while its upper portion is of convex form at its center, as at 4, and the sides thereof are turned up to form troughs or gutters 5, into which the milk is received and carried by a suitable pipe 6 to a vessel, storage-tank, or wherever desired. A trough 7, open at the top, is attached to the upper ends of the side plates 1 2. Through the bottom of the trough 7, which is curved, as shown, are two longitudinal rows of perforations 8. A greater number of rows, however, may be used, if desired. Between the tank 3 and the trough 7 is a preferably cylindrical cooler 9, the under surface of which, as shown at 10, is concaved to form two corners 11, from which milk will drop onto the tank 3 and flow thereover in opposite directions. On the outside of the support 1 is secured a receptacle 12, into which water is poured and from whence it passes through an opening 13 into the tank 3. At the opposite end of said tank is a pipe 14, connected near the top thereof with the lower end of the cylindrical cooler 9, at the top of which cooler and opposite its inlet end is an overflow-pipe 15.

In the operation of this invention water is poured into the receptacle 12 by hand or through a suitable pipe when convenient and passes therefrom into the tank 3, thence through the pipe 14 into the bottom of the cooler 9 at one end and overflowing through the pipe 15 at the opposite end, as hereinbefore mentioned. As soon as the circulation of water has been established milk will be emptied into the trough 7, from which it flows in drops or small streams through the openings 8 onto the cylindrical cooler 9, passing around opposite sides thereof in a thin sheet to the corners, from which it flows onto the convex surface of the tank 3 and thence to the gutters 5 and out through the pipe 6. From this it will be seen that the milk dropping from the openings 8 onto the cooler 9 is exposed to currents of air that may be flowing and partially cooled, aerated, and purified, as will also be the case when it drops from the corners 11 onto the tank 3. Passing around the cooler 9 and over the tank 3 in a very thin sheet the water contained in the cooler and tank rapidly extracts the heat from the milk and slightly warms the water, the natural tendency of which is to rise and flow from the tank into the cooler and away through the outlet 15, the movement of the water being augmented by the introduction of fresh cool water into the tank 3.

The milk-cooler hereinabove described is of simple construction and so arranged that all parts containing milk or over which milk flows can be thoroughly, quickly, and easily cleaned, as there are no concealed corners in which milk is liable to collect and ferment. It will therefore be seen that by the use of this milk-cooler all products which render milk dangerous to the health can be readily removed.

Having thus fully described the invention, what is claimed as new is—

1. Combined in a milk cooler and aerator, a horizontal milk-trough having a series of openings in its under side, a horizontal cooler below said milk-trough, but separated therefrom and having corners on its under side, and a longitudinal cooling-tank below said cooler, said tank having a convex top and upturned sides to form troughs or gutters for the reception of milk passing over said tank.

2. Combined in a milk cooler and aerator, a horizontal, longitudinally-disposed trough for the reception of milk, a cooler below said trough, a corner being formed on the bottom of said cooler on each side of the center thereof, a cooling-tank below said cooler provided with a trough or gutter on each side, and means for passing water through the cooling devices from the bottom.

3. A milk cooler and aerator comprising a horizontal, longitudinal trough for the reception of milk, a series of holes passing through the bottom of said trough on each side of the vertical center, a cylindrical cooler having corners on its under side, a semicircular cooling-tank below said cylindrical cooler having a gutter on each side, and means for circulating water through the cooling devices.

4. In a device of the class described, a cooler of curved form in cross-section, a milk-receptacle sustained above the cooler and adapted to discharge upon the upper curved face of the latter, and a cooling-tank disposed beneath the cooler and onto which the latter delivers the milk, said tank being provided with an upper convex face onto which milk is delivered and with a gutter for the reception of the milk.

5. In a device of the class described, a tubular cooler, a milk-receptacle disposed above the cooler and adapted to discharge thereon, a hollow cooling-tank arranged beneath the cooler and onto which the latter delivers the milk, the tank being provided with an upper convex milk-receiving face and with a milk-receiving gutter, a duct connecting the tank and cooler, a water-inlet communicating with one of said parts, and a water-outlet provided on the other of said parts, whereby a circulation of water through the tank and cooler may be maintained.

In testimony whereof I affix my signature in presence of two witnesses.

ALBERT W. LICHTFELD.

Witnesses:
 GEORGE C. LAMONT,
 FRANK S. KERN.